Nov. 26, 1940.  H. T. NICOU  2,222,912
AMBULANCE VEHICLE
Filed Jan. 31, 1939  3 Sheets-Sheet 1
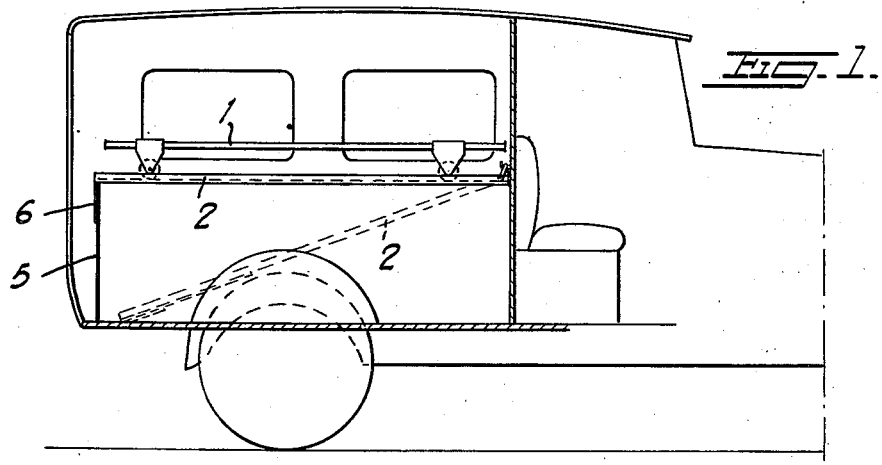
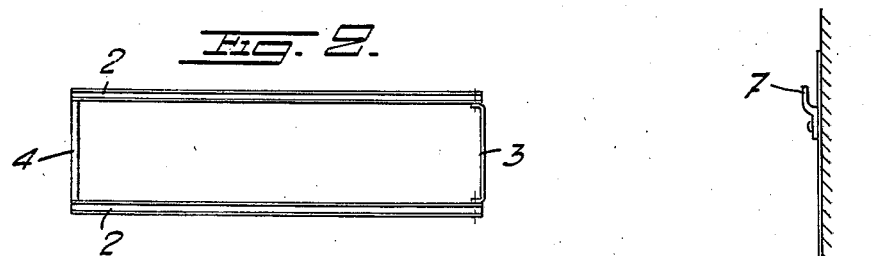
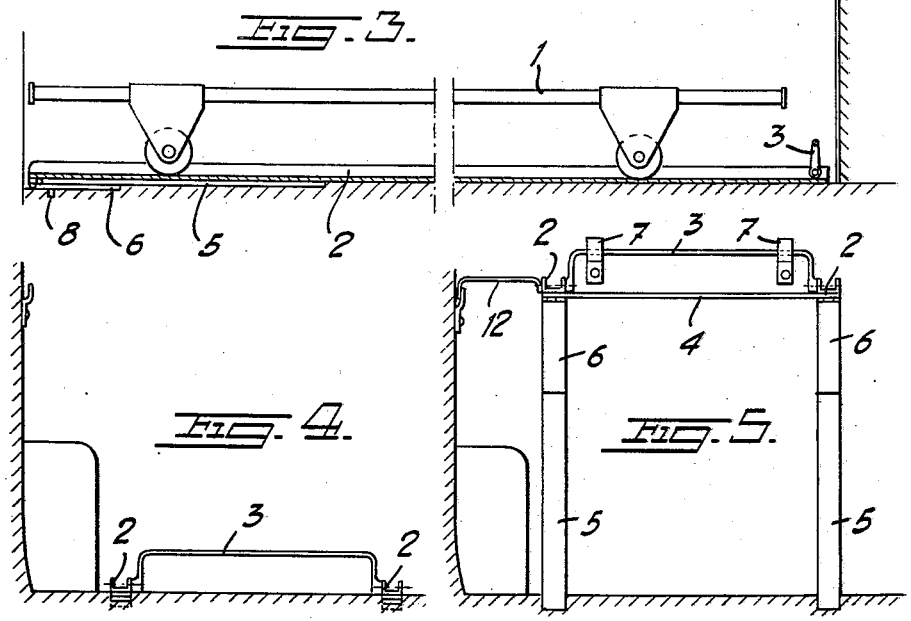
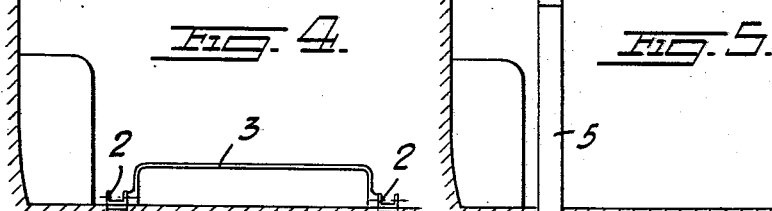
Inventor
Hans T. Nicou
By Sommers & Young Attys

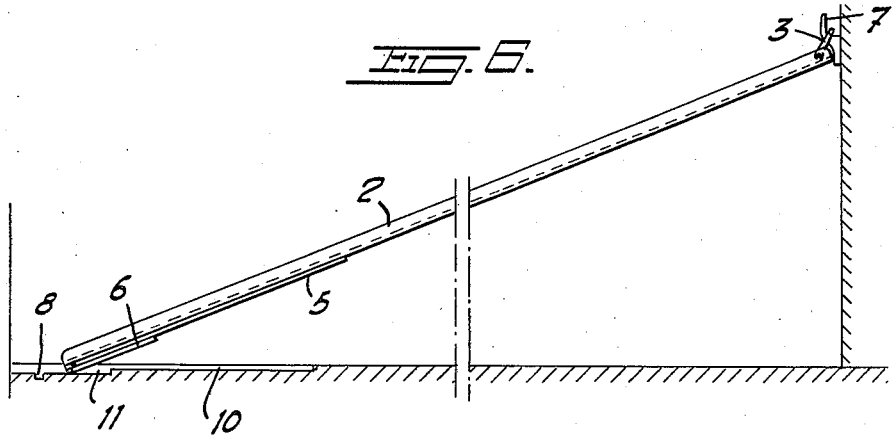
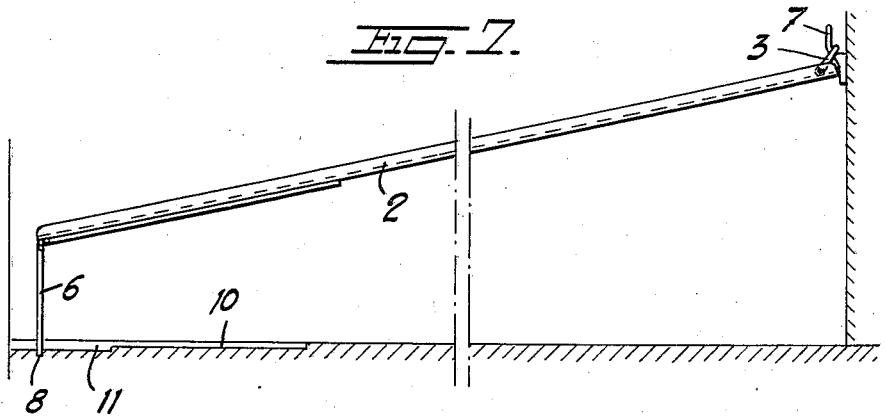
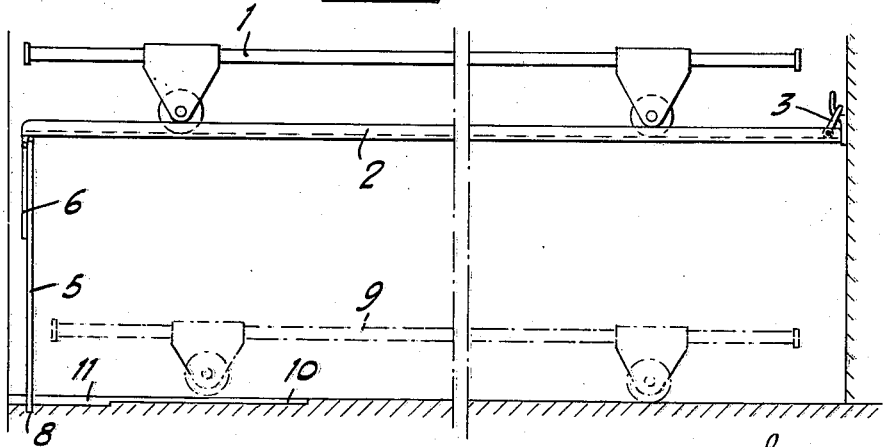

Nov. 26, 1940.   H. T. NICOU   2,222,912
AMBULANCE VEHICLE
Filed Jan. 31, 1939   3 Sheets-Sheet 3
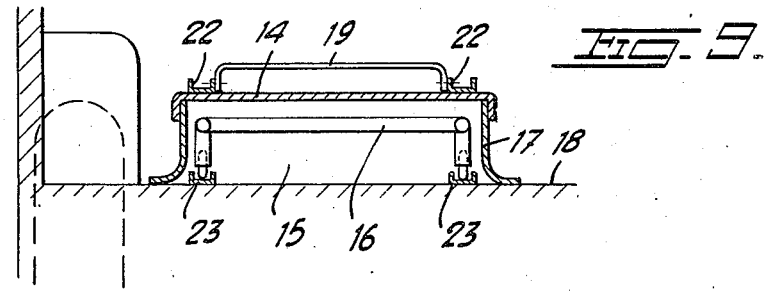
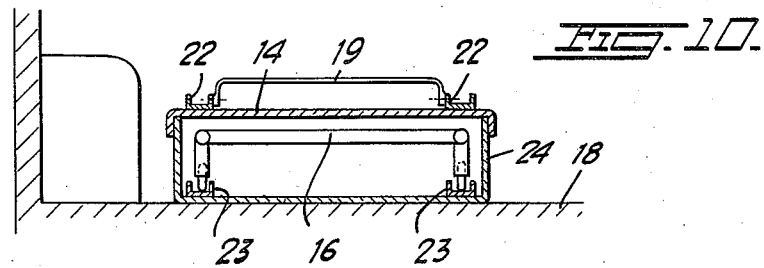
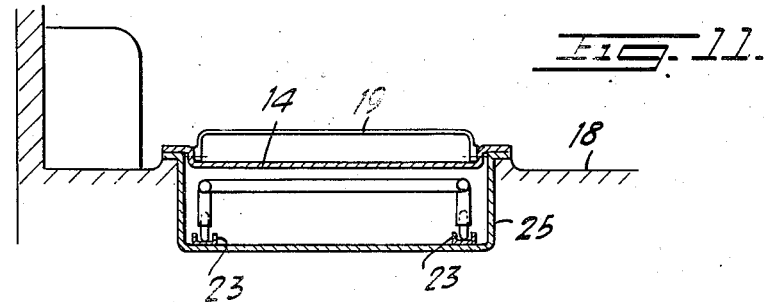
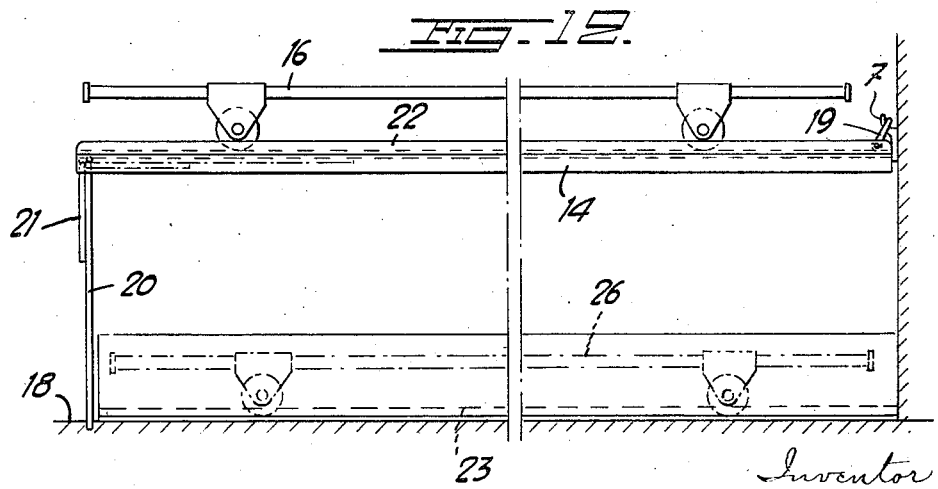
Inventor
Hans T. Nicou
By Sommers & Young attys Patented Nov. 26, 1940

2,222,912

UNITED STATES PATENT OFFICE 2,222,912

AMBULANCE VEHICLE

Hans Teodor Nicou, Sodra Angby, near Stockholm, Sweden

Application January 31, 1939, Serial No. 253,934
In Sweden March 31, 1936

4 Claims. (Cl. 296—19)

This invention relates to ambulance vehicles and more particularly to means for supporting the stretchers in such vehicles.

In order to permit two stretchers to be arranged within an ambulance automobile or a similar ambulance vehicle one above the other, many different constructions have already been proposed in order to provide a platform for supporting a stretcher at a sufficient height above the floor of the vehicle to allow a second stretcher to be placed on the floor below said platform. The proposals hitherto made in this respect have resulted, as a rule, in more or less complicated structures, considerably increasing the costs of fitting up the ambulance vehicle and occupying a more or less large amount of the space within the vehicle when not in use. Furthermore, as a rule, an important circumstance has been neglected, in that the need of an easy manipulation of the loaded stretcher in moving it into the vehicle and placing it upon the occasional stretcher supporting platform.

This invention has for its its object to provide such an occasional stretcher supporting platform which allows the loaded stretcher to be easily moved into the vehicle and placed upon the platform. For this purpose the front end of the platform is hingedly connected to the front wall of the vehicle at the desired height and, while the rear end of the platform is resting on the floor of the vehicle, the loaded stretcher may be easily pushed along the inclined platform, the rear end of which is then raised to the level of the front end and maintained in this position by legs foldably connected to the rear end of the platform.

The stretcher supporting platform according to the invention is further so constructed that when not in use, it does not encroach on the space within the vehicle in any hindering way.

In the accompanying drawings, several embodiments of the invention are illustrated. Fig. 1 is a side elevation, partly in section, of an ambulance automobile to which one form of the invention is applied. Fig. 2 is a plan view of the stretcher supporting device. Fig. 3 is a longitudinal section of the supporting device placed on the floor of the vehicle and carrying an ordinary stretcher. Fig. 4 is an end view of the stretcher supporting device in this position. Fig. 5 is an end view of the stretcher supporting device in its raised position. Fig. 6 is a side elevation of the stretcher supporting device with its front end in raised position. Fig. 7 is a side elevation of the device with its rear end in a partly raised position. Fig. 8 is a side elevation of the supporting device in its fully raised position to form a stretcher supporting platform. A stretcher is shown on said platform and a second stretcher is indicated on the floor below the platform. It is to be noted that Figs. 3–8 are on a larger scale than that of Figs. 1 and 2. Figs. 9–11 are cross sections of modified forms of the stretcher supporting device. Fig. 12 is a side elevation of the form shown in Fig. 9.

The stretcher supporting device illustrated by Figs. 1 to 8 of the drawings comprises a rectangular frame, the longer sides 2 of which are formed of two U-rails connected together at their front and rear ends. The front connection consists of a strap 3 pivoted to the U-rails, and the rear connection consists of a bar or rod 4. Hinged to the rear end of the frame are two pairs of legs, viz. a pair of longer legs 5 and a pair of shorter legs 6, each of which is situated behind the respective longer leg. Both pairs of legs may be made of iron bars. Fastening means, not shown, may be provided to hold the legs in their folded position alongside the U-rails.

Attached to the front wall of the vehicle at an appropriate height above the floor of the vehicle are a pair of hooks 7, on which the strap 3 may be hung. After the front end of the frame has been hung on said hooks 7, while the rear end of the frame is still in touch with the floor, as shown in Fig. 6 and by dotted lines in Fig. 1, a loaded stretcher may be easily pushed in along the inclined frame. Then, the rear end of the frame may be raised, either directly to the level of the hooks 7 or in two stages, i. e. first to such a height as to allow the shorter legs 6 to be folded down into vertical position and placed in appropriate recesses 8 in the floor, as shown in Fig. 7, and then to such a height as to allow the longer legs 5 to be placed in said recesses, as shown in Fig. 8. In this position the frame 2—4 acts as a platform for supporting a stretcher at a sufficient height above the floor to allow the placing of a second stretcher 9, Fig. 8, on the floor below the platform. Said second stretcher should, of course, be only so wide that it can pass between the legs 5.

Under normal conditions, that is to say, when only a single stretcher need be used, the frame is placed on the floor of the vehicle, and in this case the U-rails 1 may act as stationary guiding rails for an ordinary stretcher. In this position the frame occupies only a very little space. In the floor, appropriate grooves or recesses 10, 11 may be made for receiving the legs 5, 6 when the frame is placed on the floor, in order that the frame may lie flat upon the floor along its entire length.

In order to prevent lateral swinging movements of the frame when in use as a stretcher supporting platform, fastening means as hooks 12 or the like, Fig. 5, may be provided which connect the frame to a side wall of the vehicle.

In Fig. 9 the stretcher supporting device has the shape of a cover 14 of a chamber 15 serving to receive a stretcher 16 when not in use. Said chamber, in the example shown, is formed by a frame-like structure 17 placed on the floor 18 of the vehicle to which it may be secured in any desired way. In this case, the floor 18 of the vehicle forms the bottom of the chamber 15. The cover 14, in order to be capable of acting as a stretcher supporting platform, is provided with a strap 19 at its front end equivalent with the strap 3 of the embodiment already described, and is further provided with legs, 20 and 21, Fig. 12, at its rear end, equivalent with the legs 5 and 6 of the embodiment already described. The cover 14 carries rails 22 on its upper surface to guide the rollers or legs of the stretcher. Similar rails 23 are mounted on the floor 18 inside the chamber 15.

In Fig. 12 the cover 14 is shown in its raised position in which it supports the stretcher 16. In this figure is also indicated, by dotted lines, a second stretcher 26 standing on the stationary rails 23 of the floor 18.

Fig. 10 shows a construction similar to that shown in Fig. 9 with the exception that instead of a chamber 15 provided on the floor 18 of the vehicle, a real box 24 is provided having a bottom of its own standing on the floor 18. For the rest, the device is similar to that just described.

In Fig. 11 a box 25 is shown placed in a recess formed in the floor of the vehicle, so that only the circumferential portion of the box walls projects above the floor. In this case the cover 14 carries no rail for guiding the wheels or legs of the stretcher, a reliable guidance being afforded by the elevated circumferential portion of the cover.

It is to be noted that the stretcher supporting device may be modified in several respects without departing from the principle of the invention.

What I claim is:

1. In an ambulance vehicle, a vehicle body, a rectangular box on the floor of said body for receiving a stretcher, a removable cover for said box, said cover being provided with means for supporting and guiding a stretcher, means at the front wall of the vehicle body for carrying one end of the cover at an appropriate height above the floor of the vehicle body, means at the corresponding end of the cover for hingedly connecting said end to said carrying means, and means at the other end of the cover for facilitating the raising of said end to the level of the first-mentioned end when connected to the said carrying means and maintaining it in raised position, in order that the cover may be used as a stretcher supporting platform.

2. In an ambulance vehicle, a vehicle body having a floor provided with a recess, a rectangular box positioned in said recess in said floor for receiving a stretcher, a removable cover for said box, said cover being provided with means for supporting and guiding a stretcher, means at the front wall of the vehicle body for carrying one end of the cover at an appropriate height above the floor of the vehicle body, means at the corresponding end of the cover for hingedly connecting said end to said carrying means, and means at the other end of the cover for facilitating the raising of said other end to the level of the first-mentioned end when connected to said carrying means and for maintaining it in raised position, in order that the cover may be used as a stretcher supporting platform.

3. In an ambulance vehicle, a vehicle body having a floor provided with a recess, means forming a rectangular box positioned in said recess in the floor of said body for receiving a stretcher, a removable cover for said box, said cover being provided with elevated circumferential portions for guiding a stretcher placed on the cover, means at the front wall of the vehicle body for carrying one end of the cover at an appropriate height above the floor of the vehicle body, means at the corresponding end of the cover for hingedly connecting said end to said carrying means, and means at the other end of the cover for facilitating the raising of said end to the level of the first-mentioned end when connected to the said carrying means and for maintaining it in raised position, in order that the cover may be used as a stretcher supporting platform.

4. In an ambulance vehicle, a vehicle body having a floor, side walls, a front wall and a roof, means forming a rectangular chamber on the floor of the vehicle body for receiving a stretcher, a removable cover for said chamber, longitudinally extending guiding elements on said cover to receive and guide the supporting elements of a stretcher, a hingedly mounted strap at the front end of the cover, carrying means at the front wall of the vehicle body for carrying said end of the cover at an appropriate height above the floor of the vehicle body, when said strap is placed in engagement with said carrying means, foldable legs at the rear end of the cover for facilitating the raising of said end to the level of the first-mentioned end when carried by the means at the front wall of the vehicle body and for maintaining it in stationary position so as to allow the cover to be used as a stretcher supporting platform.

HANS TEODOR NICOU.